(12) United States Patent
Susini et al.

(10) Patent No.: US 12,267,638 B2
(45) Date of Patent: Apr. 1, 2025

(54) ELECTRICAL EQUIPMENT INCLUDING A BACKLIT BADGE AND AN INFRARED RECEIVER

(71) Applicant: SAGEMCOM BROADBAND SAS, Rueil Malmaison (FR)

(72) Inventors: Dominique Susini, Rueil Malmaison (FR); Arnaud Ferreira, Rueil Malmaison (FR); Arnaud Coffinet, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 116 days.

(21) Appl. No.: 17/899,533

(22) Filed: Aug. 30, 2022

(65) Prior Publication Data
US 2023/0067341 A1    Mar. 2, 2023

(30) Foreign Application Priority Data
Aug. 30, 2021 (FR) ...................................... 2109042

(51) Int. Cl.
*H04R 1/10* (2006.01)
*F21V 33/00* (2006.01)
*H04W 4/80* (2018.01)

(52) U.S. Cl.
CPC ....... *H04R 1/1041* (2013.01); *F21V 33/0056* (2013.01); *H04W 4/80* (2018.02)

(58) Field of Classification Search
CPC ..... H04R 1/1041; F21V 33/0056; H04W 4/80
See application file for complete search history.

(56) References Cited

U.S. PATENT DOCUMENTS

| 2013/0044459 A1 | 2/2013 | Miles et al. |
| 2020/0154184 A1* | 5/2020 | Wu ........................ H04R 1/403 |

FOREIGN PATENT DOCUMENTS

| CN | 204288726 U | 4/2015 |
| JP | 2005084221 A | 3/2005 |

* cited by examiner

*Primary Examiner* — Joseph L Williams
(74) *Attorney, Agent, or Firm* — MUNCY, GEISSLER, OLDS & LOWE, P.C.

(57) ABSTRACT

Electrical equipment includes a badge positioned over a hole of the housing, the badge comprising a first portion made at least of a first material that is transparent or translucent to visible light, and a second portion made at least of a second material that is opaque to visible light and transparent or translucent to infrared light, the first and second portions forming respectively a pattern and a background distinct from the pattern on an outside surface of the badge; an emitter arranged to emit visible light signals through the badge so as to illuminate the pattern without illuminating the background, and a receiver arranged to receive infrared communication signals emitted by a device that is distinct from the electrical equipment and passing through the badge.

15 Claims, 3 Drawing Sheets

ELECTRICAL EQUIPMENT INCLUDING A BACKLIT BADGE AND AN INFRARED RECEIVER

The invention relates to the field of electrical equipment including a housing that has a pattern formed thereon, e.g. representing a logo or a trademark, and that is also suitable for being controlled by infrared communication signals.

BACKGROUND OF THE INVENTION

Electrical equipment, and in particular electrical equipment incorporating audio playback means, is known that includes a housing that is covered at least in part by acoustic fabric.

By way of example, such equipment may be a loudspeaker (possibly a smartspeaker and/or a portable speaker), a decoder, a residential gateway, etc.

Some such equipment needs to be capable of being controlled by infrared communication signals emitted by a remote control. However, acoustic fabric attenuates infrared communication signals strongly, such that this function is relatively complicated to implement (at least in a zone of the housing that is covered by fabric).

Most such equipment also includes a pattern formed on the housing, e.g. a pattern representing a trademark or a logo for identifying the equipment or the manufacturer of the equipment. Proposals have been made to backlight this pattern in order to make it more visible and to improve the general appearance of the equipment while it is in operation.

However, once again, lighting a pattern through acoustic fabric is not very practical because the effect of the lighting is degraded by the fabric. Likewise, it is difficult to implement any function involving light passing through the fabric, such as a standby/active indicator light.

OBJECT OF THE INVENTION

An object of the invention is to provide a solution that makes it possible to backlight a pattern that is formed on the housing of equipment that might include acoustic fabric, to communicate effectively with the equipment via infrared communication signals, and to reduce the cost of the equipment.

SUMMARY OF THE INVENTION

In order to achieve this object, there is provided electrical equipment comprising:
  a housing including a hole through a face of the housing;
  a badge fastened to the housing and positioned over the hole, the badge comprising a first portion made at least of a first material that is transparent or translucent to visible light, and a second portion made at least of a second material that is opaque to visible light and transparent or translucent to infrared light, the first and second portions forming respectively a pattern and a background distinct from the pattern on an outside surface of the badge;
  an emitter and a receiver situated inside the housing facing the hole and thus facing the badge, the emitter being arranged to emit visible light signals through the badge so as to illuminate the pattern without illuminating the background, and the receiver being arranged to receive infrared communication signals emitted by a device that is distinct from the electrical equipment and passing through the badge.

The badge, which includes a first portion that allows visible light to pass and a second portion that is opaque to visible light, is thus backlit by the emitter, thereby serving to light the pattern without lighting the background. And the receiver receives infrared communication signals through the badge.

In the event of the housing including acoustic fabric, given that the badge is positioned over the hole passing through the wall of the housing and thus through the fabric, visible light signals are emitted through the badge and infrared communication signals are received through the badge, and they are therefore not disturbed by the fabric.

The invention also makes it possible to use the same area of the housing both to represent the pattern and also to pass infrared communication signals for reception, thereby limiting the space occupied by these functions (and thus by the electrical equipment as a whole), which in turn reduces cost.

There is also provided electrical equipment as described above, further comprising a diffuser element made of a third material that is arranged to defuse visible light, the diffuser element being positioned between the badge and the emitter.

There is also provided electrical equipment as described above, wherein the diffuser element is incorporated in the badge.

There is also provided electrical equipment as described above, wherein the first portion and the second portion together form a single part.

There is also provided electrical equipment as described above, wherein the badge is manufactured by using an overmolding technique or a bi-injection technique.

There is also provided electrical equipment as described above, wherein the housing comprises a rigid support and an acoustic fabric positioned on an outside surface of the rigid support.

There is also provided electrical equipment as described above, wherein the rigid support includes a setback in which the badge is positioned, the depth of the setback being substantially equal to the thickness of the badge, such that an outside face of the badge is flush with the acoustic fabric.

There is also provided electrical equipment as described above, wherein the badge includes at least one fastener peg that passes through the housing and that is assembled to the housing in order to fasten the badge to the housing.

There is also provided electrical equipment as described above, wherein a free end of the fastener peg is assembled to an inside surface of the housing by ultrasonic welding or by heat staking.

There is also provided electrical equipment as described above, further comprising protection means arranged to limit the extent to which visible light signals emitted by the emitter influence the operation of the receiver.

There is also provided electrical equipment as described above, the protection means comprise an insulating element projecting from an inside face of the badge.

There is also provided electrical equipment as described above, the insulating element being positioned in such a manner that a plane perpendicular to the inside face of the badge and passing between the emitter and the receiver also passes via the insulating element.

There is also provided electrical equipment as described above, wherein the protection means comprise electronic and/or software means arranged to ensure that visible light signals are emitted by the emitter at a repetition rate that differs from a frequency at which the infrared communication signals received by the receiver are modulated, with this difference being greater than a predetermined threshold.

There is also provided electrical equipment as described above, wherein the protection means include an opaque mask and/or a polarizing filter positioned on or over the receiver.

There is also provided electrical equipment as described above, the electrical equipment being a decoder or a residential gateway or a loudspeaker.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
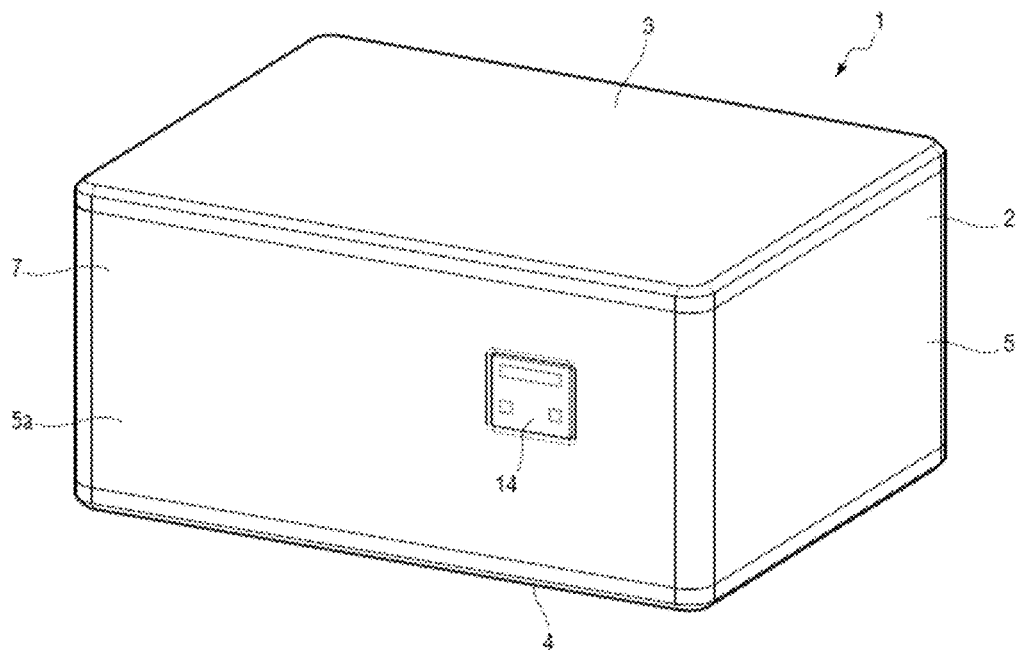
FIG. 1 is a perspective view of electrical equipment of the invention.
Figure 2:
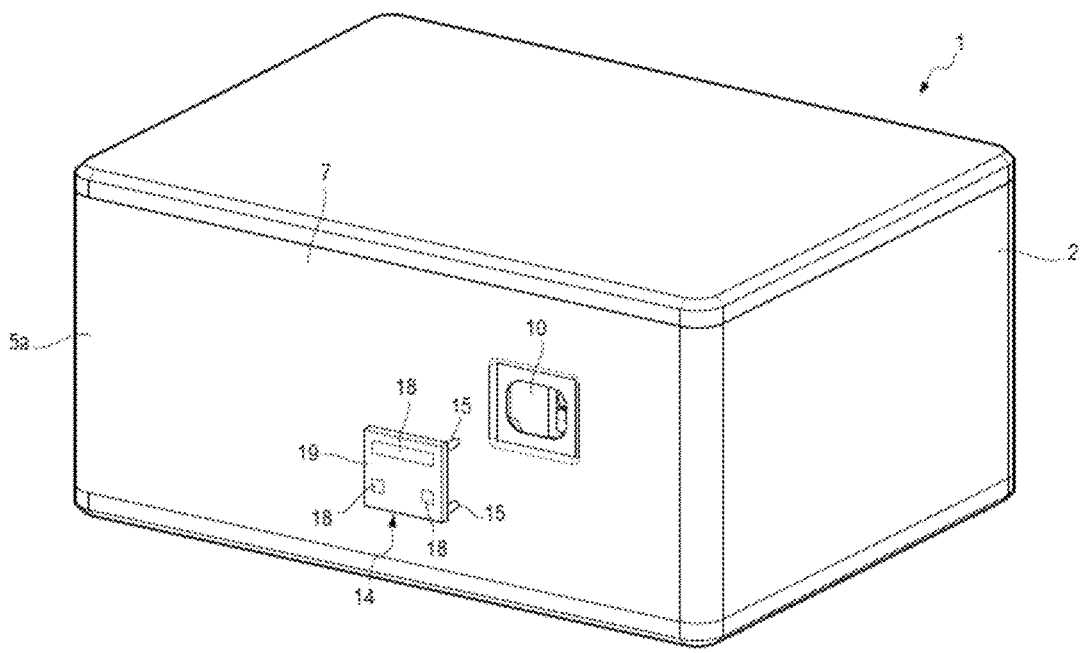
FIG. 2 is a figure similar to FIG. 1, with the badge removed and spaced apart from the electrical equipment.
Figure 3:
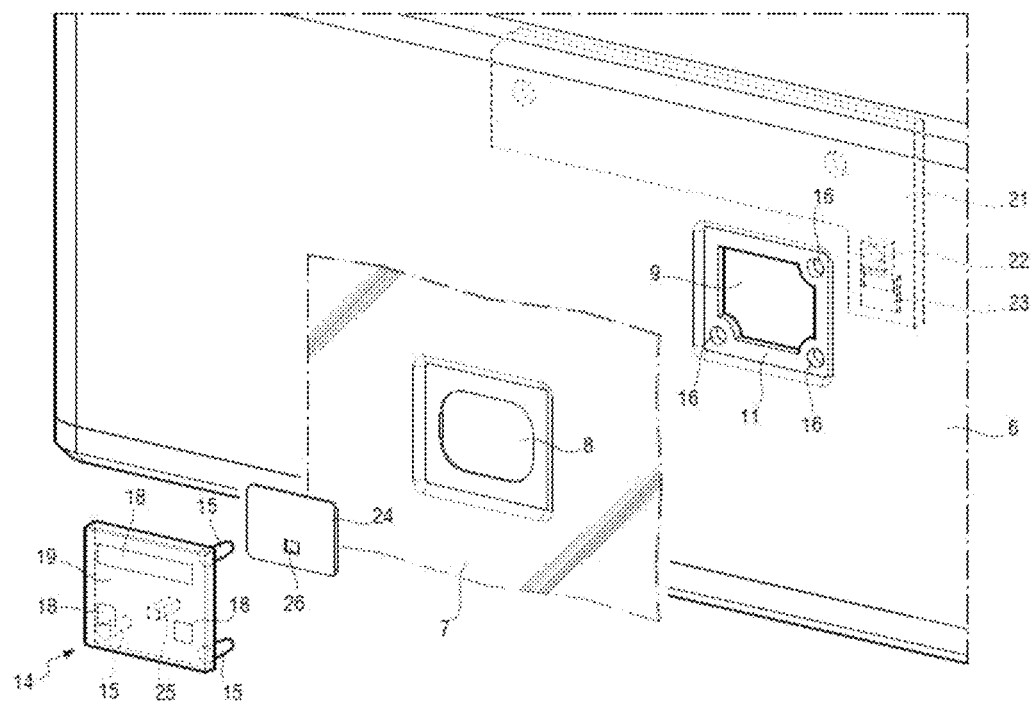
FIG. 3 is a detail view of FIG. 2, in which the diffuser element is spaced apart from the badge and a portion of the fabric is removed from the housing.
Figure 4:
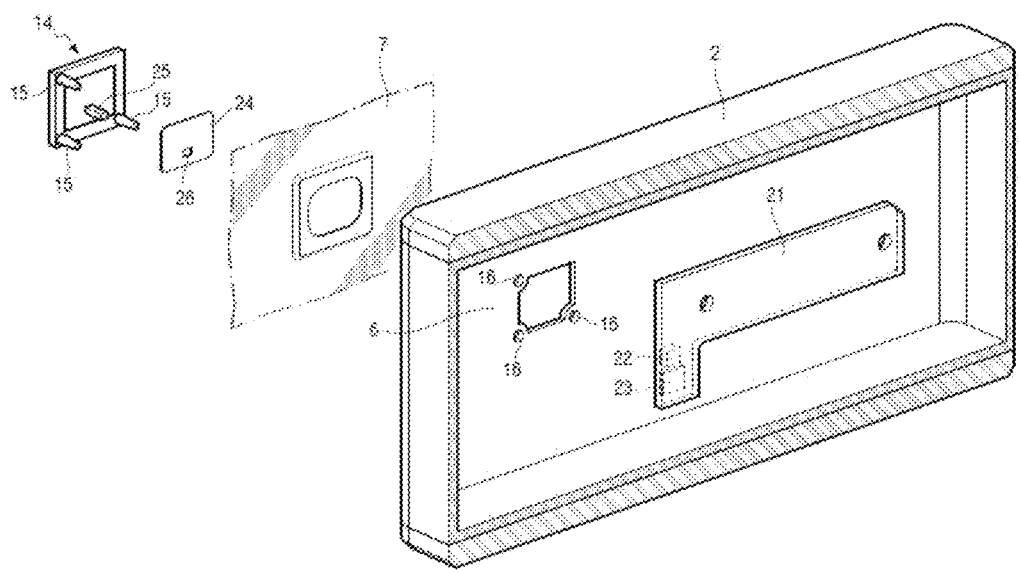
FIG. 4 shows the items of FIG. 3 as seen from inside the housing in a view that is in perspective and in section on a plane parallel to the front face of the housing.
Figure 5:
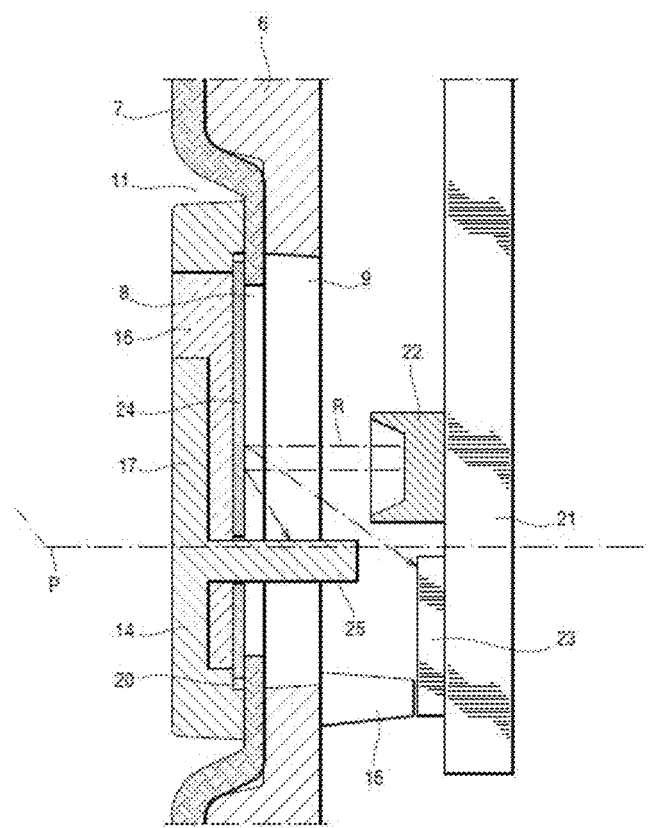
FIG. 5 is a detail view of the electrical equipment in section on a plane perpendicular to the front face of the housing, showing in particular the badge, the housing, the emitter, and the receiver.

With reference to FIGS. 1 to 5, in this example the electrical equipment of the invention is a decoder 1.

The decoder 1 comprises a housing 2 that separates the inside of the decoder 1 from the outside and that houses various components. These components include in particular audio playback means comprising a loudspeaker and electronic components arranged to acquire audio signals and to deliver sound signals via the loudspeaker.

The housing 2 is generally in the shape of a rectangular parallelepiped with rounded side edges, and it has a top face 3, a bottom face 4, and side faces 5. The side faces 5 include a front face 5a. The side faces 5 of the housing 2 are formed by a rigid support 6 and by acoustic fabric 7 positioned on an outside surface of the rigid support 6 and covering the rigid support 6.

In this example, the term "outside" means outside the decoder 1, and the term "inside" means inside the decoder 1.

The fabric 7 includes a first opening 8 and the rigid support 6 includes a second opening 9, which openings are superposed at least in part when the fabric 7 is in position on the rigid support 6, thereby forming a hole 10 passing through the rigid support 6 and the fabric 7, and thus through a face of the housing 2, and they are situated specifically in the front face 5a of the housing 2.

In this example, the first opening 8 is rectangular in shape with four outwardly rounded corners, and the second opening 9 is rectangular in shape with three inwardly rounded corners. The first opening 8 is of slightly smaller dimensions than the second opening 9.

In its thickness, the rigid support 6 includes a setback 11 of rectangular section. This setback 11 is formed from the outside surface of the rigid support 6 going towards the inside of the rigid support 6.

The second opening 9 occupies a majority fraction of the back wall of the setback 11, and the remainder of the back wall of the setback 11 is covered by the fabric 7, which overlaps the edges of the second opening 9 a little.

It should be observed that the first opening 8 that is formed in the fabric 7 may either be made in advance, or else it may be made after the fabric 7 has been assembled on the rigid support 6.

The decoder 1 also comprises a badge 14. The faces of the badge 14 are rectangular in shape. The thickness of the badge 14 is much smaller than the length and the width of its faces, thereby imparting a flat shape to the badge.

When the decoder 1 is assembled, the badge 14 is incorporated in the thickness of the housing 2 and is fastened to the housing 2 by being positioned over the hole 10.

Naturally, the hole 10 should not be visible, and it must therefore be smaller than the dimensions of the badge 14. The badge 14 covers and closes the hole 10.

More precisely, the badge 14 is positioned in the setback 11 in the rigid support 6. The depth of the setback 11 is substantially equal to the thickness of the badge 14 such that the outside face of the badge 14 is flush with the fabric 7. The length and the width of the badge 14 are substantially equal to the length and the width of the setback 11, such that when the badge 14 is positioned in the setback 11, it fills the setback 11.

The badge 14 also has at least one fastener peg 15 (similar to a punch), and specifically it has three fastener pegs 15 in this example. Each of the fastener pegs 15 extends from a respective corner of the inside face of the badge 14. While the decoder 1 is being assembled, the badge 14 is moved from outside the housing 2 against the back wall of the setback 11. The fastener pegs 15 then punch through the fabric 7 and are received in fastener holes 16 formed in the rigid support 6 (in the rounded corners of the second opening 9), such that once the badge 14 is in position in the setback 11, each fastener peg 15 passes through a face of the housing 2 so that the free end of each fastener peg 15 projects from the inside surface of the rigid support 6. Each fastener peg 15 is then assembled to the rigid support 6 of the housing 2.

The free end of each fastener peg 15 is then assembled to the inside surface of the rigid support 6, e.g. by ultrasonic welding or by heat staking.

Furthermore, the badge 14 is made up of first and second portions 16 and 17.

The first portion 16 is made of a first material that is transparent or translucent to visible light (i.e. it allows at least some visible light to pass through). By way of example, the first material may be a plastics material of polycarbonate type, possibly incorporating a transparent or translucent dye. In this example, the first portion 16 passes the entire light spectrum, including visible light. The first portion 16 thus allows infrared light to pass.

The second portion 17 is made of a second material that is opaque to visible light (i.e. it does not allow visible light to pass through) and that is transparent or translucent to infrared light. By way of example, the second material is a plastics material of polycarbonate type or of methylmethacrylate-acrylonitrile-butadiene-styrene (MABS) type.

In this example, the first portion 16 and the second portion 17 form a single part. By way of example, the badge 14 is manufactured by using an overmolding technique or a bi-injection technique.

On an outside surface of the badge 14 (on its outside face), the first and second portions 16 and 17 form respectively a pattern 18 and a background 19 that is distinct from the pattern 18.

In this example, the pattern 18 comprises a horizontal strip and two squares situated under the ends of the horizontal strip.

The badge 14 also includes a setback 20 in its thickness, which setback is formed from the inside face of the badge 14 going into the badge 14. The function of the setback 20 is explained below.

The decoder 1 also comprises a circuit card 21 that is situated inside the housing 2. The circuit card 21 is positioned in parallel with the front face 5a in which the hole 10 is formed, and in the proximity of the rigid support 6.

An emitter 22 and a receiver 23 are mounted on the circuit card 21 and they are situated facing the hole 10, thus facing the inside face of the badge 14.

The emitter 22 is arranged to emit visible light signals through the portion 16, so as to illuminate the pattern 18 without illuminating the background 19.

In this example, the emitter 22 is a light-emitting diode (LED) of red-green-blue (RGB) type. The LED is controlled by a driver circuit mounted on the circuit card 21 and including an LED controller. The LED controller may be programmed within a component that is also used for other functions (e.g. in a microcontroller), or it may be a component that is dedicated to controlling the LED.

The emitter 22 is thus used to backlight the pattern 18 of the badge 14, i.e. to light it from inside the housing 2. The pattern 18 is thus clearly distinguished from the background 19, since the background is not illuminated because the second material of the second portion 17 of the badge 14 is opaque to visible light.

The receiver 23 is arranged to receive infrared communication signals that are emitted by a device that is separate from the decoder and that pass through the badge 14. The receiver 23 is thus an infrared receiver enabling the decoder 1 to be controlled from outside the decoder, e.g. by using a remote control.

The circuit card 21 is positioned inside the housing 2 so that the sensitive portion of the emitter 22 and the sensitive portion of the receiver 23 are situated in the proximity of the inside face of the badge 14. The distances between the sensitive portions and the inside face of the badge 14 typically lie in the range 1 millimeter (mm) to 2 centimeters (cm).

Figure 6:
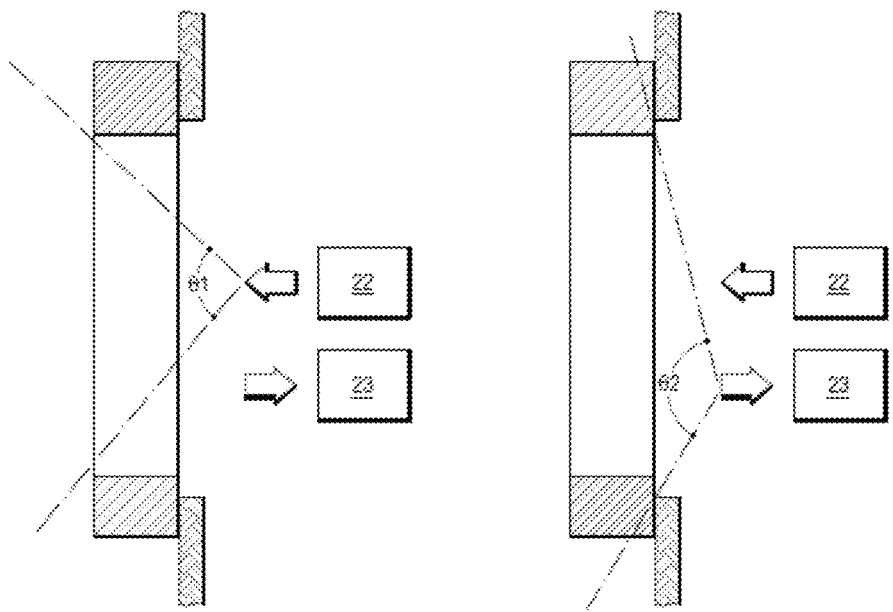
FIG. 6 is a diagram showing a maximum emission angle of the emitter and a maximum reception angle of the receiver.

In FIG. 6, there can be seen the maximum emission angle θ1 of the emitter 22 and the maximum reception angle θ2 of the receiver 23.

The maximum reception angle θ2 of the receiver 23 depends mainly on the dimensions of the hole 10 made in the front face 5a of the housing 2. The hole 10 needs to be large enough to maximize the maximum reception angle θ2 of the receiver 23.

The maximum emission angle θ1 of the LED naturally depends on the dimensions of the first portion 16 of the badge 14, and in particular on the widths and on the lengths of the various elements of the first portion 16 in the outside face of the badge 14. The maximum emission angle θ1 of the LED also depends on the distance of the LED from the badge 14: the closer the LED is to the badge 14, the greater the maximum emission angle θ1 and the smaller the need for the badge 14 to have dimensions that are large.

Furthermore, due to a lack of available space, the LED might be too bright, and it might not cover the pattern 18 in uniform manner.

Under such circumstances, it might be appropriate to make the first portion of the badge 16 out of a first material that is milky or opalescent, or to make use of frosted textures.

As an alternative, or in combination, it is also possible to solve this problem by using a diffuser element 24 comprising a third material that is arranged to diffuse visible light.

The diffuser element 24 is positioned between the badge 14 and the emitter 22.

In this example, the diffuser element 24 is flat in shape and it is incorporated in the badge 14 by being received in the above-described setback 20 in the badge 14. The diffuser element 24 thus occupies a major fraction of the inside face of the badge 14.

It should be observed that the first portion 16, the second portion 17 and the diffuser element 24 could form a single part.

Since the badge 14 is relatively small in size, the emitter 22 and the receiver 23 are positioned relatively close to each other on the circuit card 21. Because of this proximity, the receiver 23 can pick up visible light signals emitted by the emitter 22, either directly, or else indirectly, with the visible light signals then being signals R that have been reflected by surfaces situated in the proximity of the receiver 23 (the diffuser element 24, the rigid support 6, etc.).

Protection means are used to handle this problem, and thus to limit the extent to which visible light signals emitted by the emitter 22 influence the operation of the receiver 23.

In this example, the protection means comprise an insulating element 25, specifically a tab projecting from the inside face of the badge 14 and forming part of the second portion 17 of the badge 14 (the portion that is opaque to visible light). The insulating element 25 passes through the diffuser element 24 via a hole 26 made therein.

The insulating element 25 is positioned in such a manner that a plane P perpendicular to the inside face of the badge 14 and passing between the emitter 22 and the receiver 23 also passes via the insulating element 25.

This insulating element 25 thus forms a projection that is localized in a zone of the badge 14 that does not disturb illumination of its pattern. This protection serves to absorb reflected visible light signals, like a peaked cap.

The protection means may also comprise electronic and/or software means arranged to ensure that visible light signals are emitted by the emitter 22 at a repetition rate that differs from a frequency at which the infrared communication signals received by the receiver 23 are modulated, with this difference being greater than a predetermined threshold. By way of example, the predetermined threshold may lie the range 5 kilohertz (kHz) to 20 kHz.

In this example, the protection means include computer program instructions for programming the LED controller so that the repetition rate at which visible light signals are emitted satisfies this constraint.

The protection means may also include an opaque mask positioned on or over the receiver 23 so as to mask the receiver 23 and thus make it less sensitive, and/or a polarizing filter positioned on or over the receiver 23.

Naturally, the various protection means described may be used individually or in combination.

Naturally, the invention is not limited to the embodiment described, but covers any variant coming within the ambit of the invention as defined by the claims.

Naturally, the electrical equipment in which the invention is implemented need not necessarily be a decoder, but could be some other type of electrical equipment, optionally provided with audio playback means, optionally covered in acoustic fabric, and for example it could be a residential gateway or a loudspeaker (optionally a smartspeaker and/or a portable speaker).

The pattern that is formed on the badge and that is backlit need not necessarily be a logo or a trademark. It could be any kind of indicator light, Whether serving to perform a function or merely to enhance appearance: e.g. some other interface symbol, a standby/activity indicator, a battery charge indicator, backlighting for a button, etc.

In this example, the term "pattern" is used to designate the portion of the badge that is backlit, and the term "background" is used to designate the portion that is opaque to visible light. Naturally, when using a logo or a trademark (or any other symbol), it is entirely possible for the background to represent the logo or the trademark. The logo or the trademark would then not be backlit, but would be distinguished just as clearly from the remainder of the badge, since the remainder would then be backlit.

It is stated above that the first and second portions of the badge in this example form a single part, however it is naturally possible for them to be two distinct parts that are assembled together while manufacturing the badge.

The diffuser element could be different from that described above; for example it would be possible to use a sheet of polycarbonate. The diffuser element need not necessarily be incorporated in the badge, and it could be a distinct element positioned between the badge and the visible light emitter.

The badge could be fastened to the housing in some other manner, e.g. by a spring clip system.

The invention claimed is:

1. An electrical equipment comprising:
a housing including a hole through a face of the housing;
a badge fastened to the housing and positioned over the hole, the badge comprising a first portion made at least of a first material that is transparent or translucent to visible light,
wherein the badge further comprises a second portion made at least of a second material that is opaque to visible light and transparent or translucent to infrared light, the first and second portions forming respectively a pattern and a background distinct from the pattern on an outside surface of the badge;
the electrical equipment further comprising:
an emitter and a receiver situated inside the housing facing the hole and thus facing the badge, the emitter being arranged to emit visible light signals through the badge so as to illuminate the pattern without illuminating the background, and the receiver being arranged to receive infrared communication signals emitted by a device that is distinct from the electrical equipment and passing through the badge.

2. The electrical equipment according to claim 1, further comprising a diffuser element made of a third material that is arranged to defuse visible light, the diffuser element being positioned between the badge and the emitter.

3. The electrical equipment according to claim 2, wherein the diffuser element is incorporated in the badge.

4. The electrical equipment according to claim 1, wherein the first portion and the second portion together form a single part.

5. The electrical equipment according to claim 4, wherein the badge is manufactured by using an overmolding technique or a bi-injection technique.

6. The electrical equipment according to claim 1, wherein the housing comprises a rigid support and an acoustic fabric positioned on an outside surface of the rigid support.

7. The electrical equipment according to claim 6, wherein the rigid support includes a setback in which the badge is positioned, the depth of the setback being substantially equal to the thickness of the badge, such that an outside face of the badge is flush with the acoustic fabric.

8. The electrical equipment according to claim 1, wherein the badge includes at least one fastener peg that passes through the housing and that is assembled to the housing in order to fasten the badge to the housing.

9. The electrical equipment according to claim 8, wherein a free end of the fastener peg is assembled to an inside surface of the housing by ultrasonic welding or by heat staking.

10. The electrical equipment according to claim 1, further comprising protection means arranged to limit the extent to which visible light signals emitted by the emitter influence the operation of the receiver.

11. The electrical equipment according to claim 10, the protection means comprise an insulating element projecting from an inside face of the badge.

12. The electrical equipment according to claim 11, the insulating element being positioned in such a manner that a plane perpendicular to the inside face of the badge and passing between the emitter and the receiver also passes via the insulating element.

13. The electrical equipment according to claim 10, wherein the protection means comprise electronic and/or software means arranged to ensure that visible light signals are emitted by the emitter at a repetition rate that differs from a frequency at which the infrared communication signals received by the receiver are modulated, with this difference being greater than a predetermined threshold.

14. The electrical equipment according to claim 10, wherein the protection means include an opaque mask and/or a polarizing filter positioned on or over the receiver.

15. The electrical equipment according to claim 1, the electrical equipment being a decoder or a residential gateway or a loudspeaker.

* * * * *